April 7, 1925.  1,532,723
A. B. WEBB
PLOW
Filed Dec. 21, 1923   3 Sheets-Sheet 2
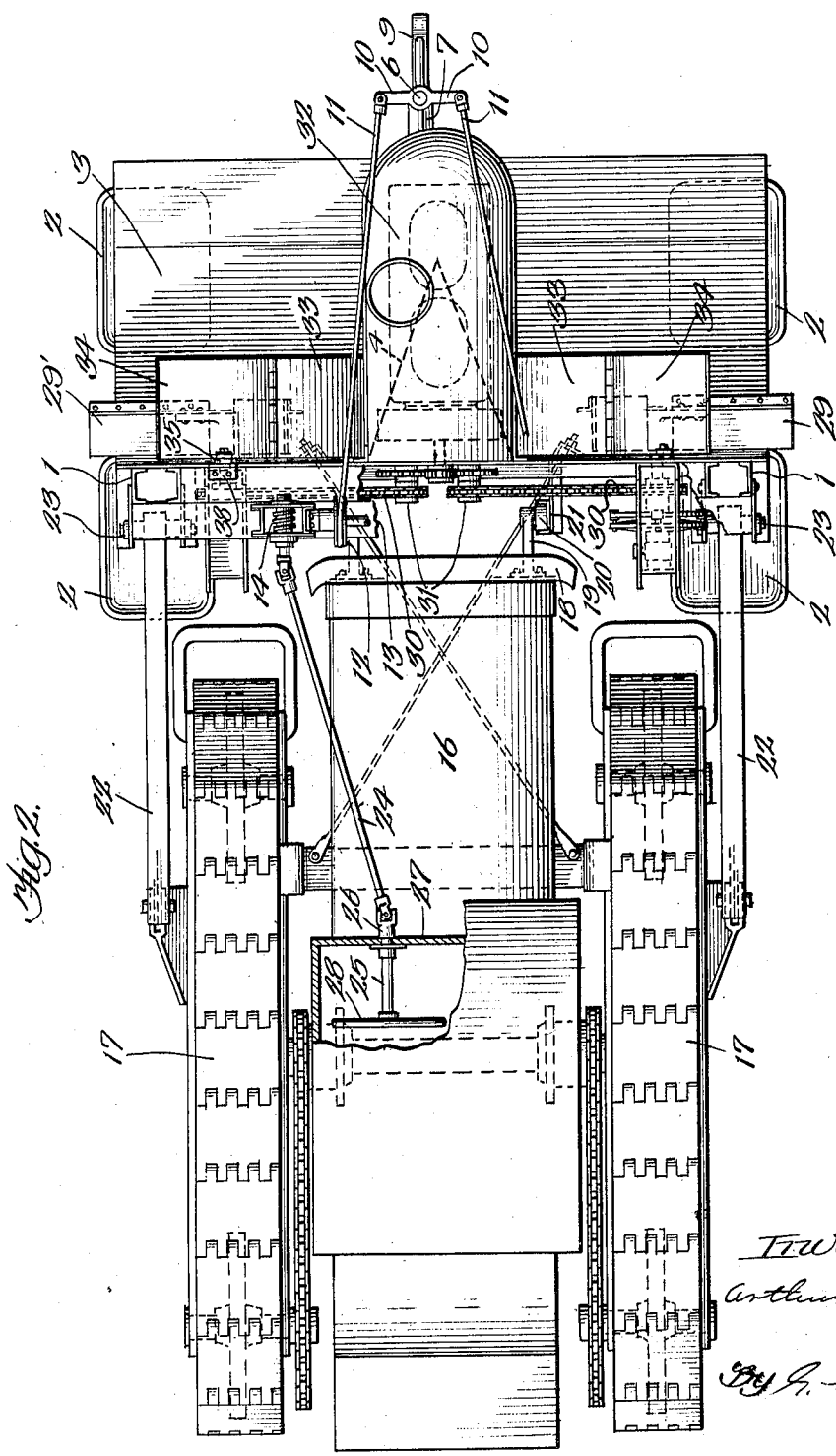

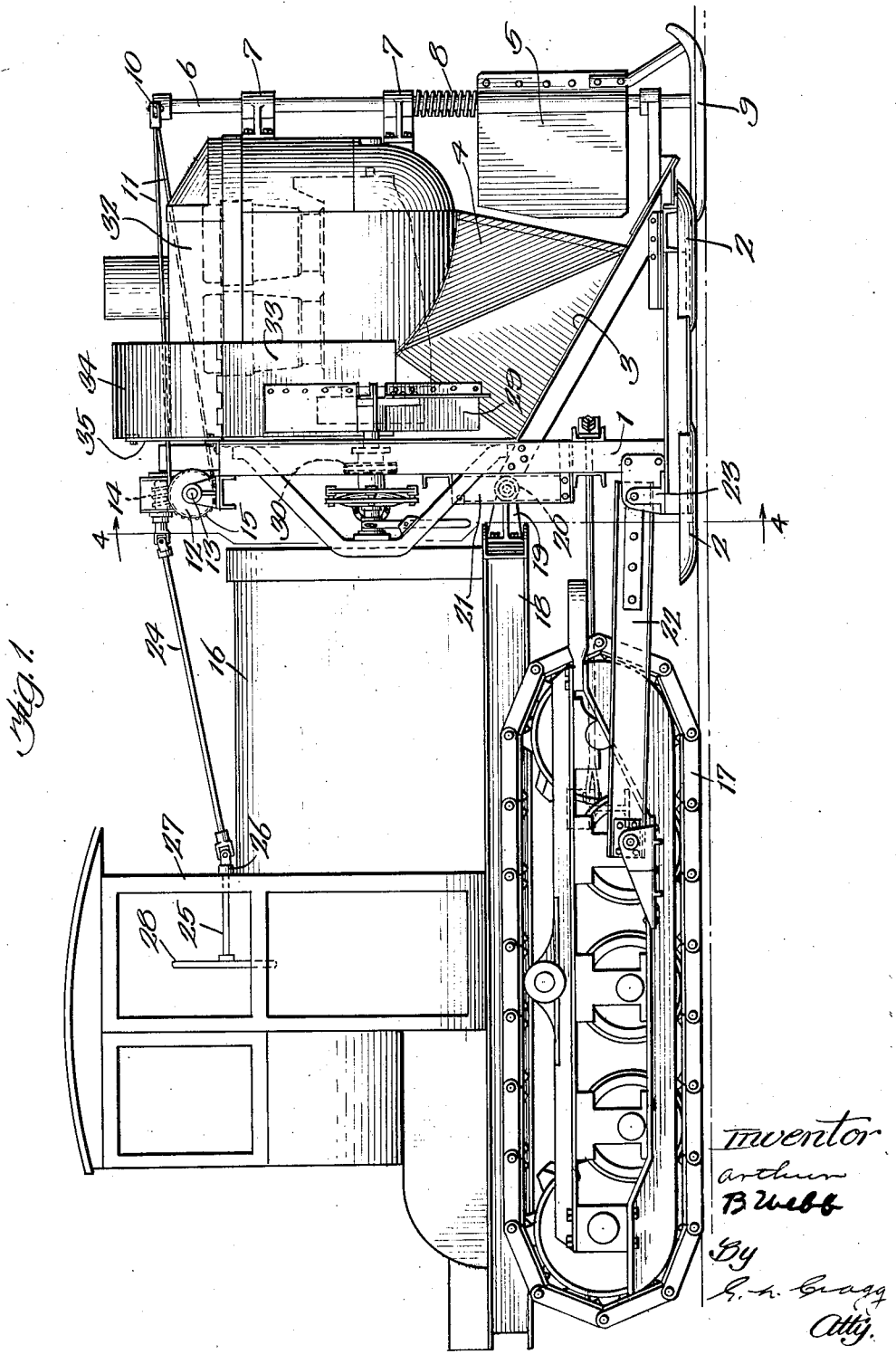

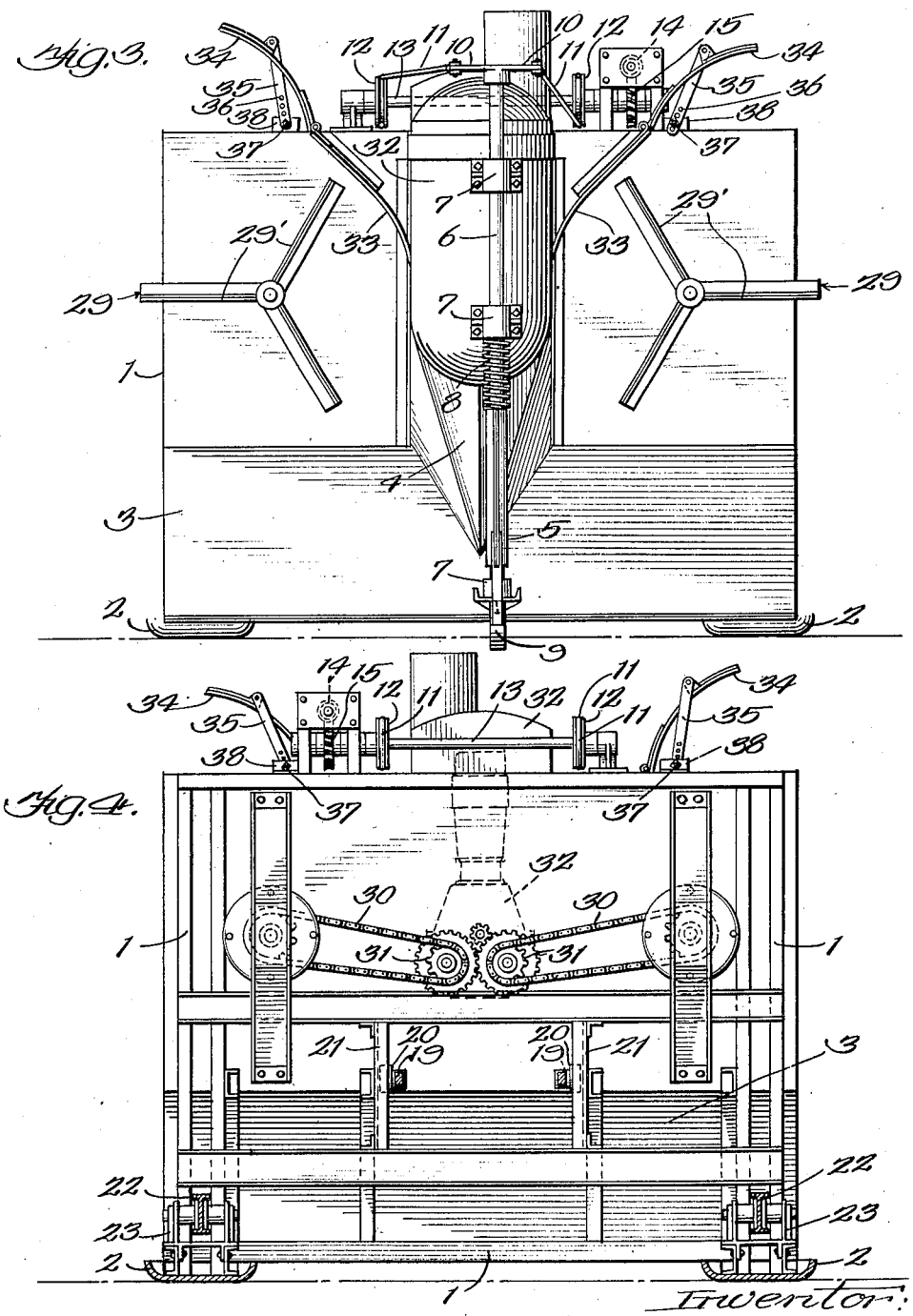

Patented Apr. 7, 1925.

1,532,723

UNITED STATES PATENT OFFICE.

ARTHUR B. WEBB, OF WATERTOWN, WISCONSIN, ASSIGNOR TO MONARCH TRACTORS INCORPORATED, OF WATERTOWN, WISCONSIN, A CORPORATION OF DELAWARE.

PLOW.

Application filed December 21, 1923. Serial No. 681,982.

*To all whom it may concern:*

Be it known that I, ARTHUR B. WEBB, citizen of the United States, residing at Watertown, in the county of Jefferson and State of Wisconsin, have invented a certain new and useful Improvement in Plows, of which the following is a full, clear, concise, and exact description.

My invention relates broadly to vehicles and is of particular utility in connection with plows, and especially snow plows, though the invention is not to be thus limited.

In accordance with one characteristic of the invention the plow is inclusive of a downwardly and forwardly inclined substantially horizontal shovel and an upright cutter located above the shovel. This cutter is preferably located at and above the mid portion of the shovel and at the rear of the front edge thereof and is desirably of wedging formation with its wedging edge at the front. One or more rotary dischargers are mounted above the shovel, one preferably on each side of the cutter, to cast on the opposite sides of the plow, snow or other matter shoveled up by the shovel and subdivided by the cutter. A motor or engine for operating the rotary dischargers is carried by the plow above the cutter and there are preferably runners under the plow, and beneath the motor or engine and cutter, to make the plow short in length and to concentrate its weight at the shovel to increase the efficiency. The steering mechanism includes a rudder mounted to turn upon an upright axis in front of the cutter and also a runner to bear upon the snow or ground and mounted beneath the rudder to turn therewith.

My invention also includes a second vehicle in addition to the plow and behind the same to be in pushing relation thereto. The rear vehicle is preferably in the form of an endless track tractor so coupled with the plow as to prevent the plow from swinging longitudinally of the rear vehicle when the plow and the rear vehicle are upon grades, the coupling permitting up and down movement of the plow with respect to the rear vehicle to afford sufficient flexibility of union between the two vehicles. The person in charge of the apparatus is desirably stationed upon the rear vehicle where he has access to the operating member of a controller for the steering mechanism.

The invention will be more fully explained in connection with the accompanying drawings in which Fig. 1 is a side view illustrating two vehicles related in accordance with my invention; Fig. 2 is a plan view of the apparatus shown in Fig. 1 with some of the parts broken away; Fig. 3 is a front elevation of the plow; and Fig. 4 is a sectional view on line 4—4 of Fig. 1.

Like parts are indicated by similar characters of reference throughout the different figures.

The plow illustrated includes an upright framework 1 and underlying runners 2. A horizontal shovel 3 extends crosswise of the plow, being forwardly and downwardly inclined, some of the runners 2 underlie this shovel. An upright cutter 4 is located at and above the mid portion of the shovel. This cutter is desirably of wedge shape with the wedging edge at the front and angular to the shovel behind whose lower front edge this wedging edge is located. The mechanism for steering the plow is desirably inclusive of an upright rudder blade 5 carried by a shaft 6 which is mounted to turn upon an upright axis in front of the cutter 4. The plow carries three vertically aligned sleeves 7 in which the shaft 6 is mounted to turn and in which sleeves said shaft may move longitudinally of its axis. A cushioning spring 8 surrounds the shaft 6, this spring bearing at its lower end upon the top of the rudder 5 and at its upper end against the bottom of the intermediate sleeve 7. A narrow runner 9 is desirably also carried upon the shaft 6 below the bottom sleeve 7. This runner is in the same vertical plane with the rudder 5 and turns therewith to aid in steering. The spring 8 maintains the runner upon the snow or ground.

The controller for governing the steering mechanism, in the embodiment of the invention illustrated, includes arms 10 secured to and projecting from the opposite sides of the shaft 6. Cables 11 are attached to these arms and are directed upon the sheaves 12 that are fixed upon the shaft 13, one cable leading to the top of one sheave and the other leading to the bottom of the other sheave. The shaft 6 is turned by turning the shaft 13 in any suitable way, as, for example, by means of a hand turned worm 14 with the worm wheel 15 upon the shaft 13.

The snow plow thus constructed is suitably assembled with some means for effecting its travel over the ground. The means employed is preferably a self propelled vehicle disposed to the rear of the plow to be in pushing relation thereto.

The vehicle illustrated is in the form of a tractor 16 supported upon trucks having endless tracks 17 and commonly known as an endless track tractor. The main frame 18 of the body of the tractor is assembled in any usual or preferred way with the tractor trucks. The frame 18 is provided with brackets 19 that project forwardly therefrom and which carry rollers 20 that enter the channels of the upright channel irons 21 which are carried upon the upright frame 1 of the plow. Links 22 are pivotally connected at their rear ends with the truck frames of the tractor and at their forward ends with the brackets 23 that are carried by and rearwardly project from the frame 1 of the plow.

The elements 19, 20, 21, 22 and 23 constitute a coupling for joining the plow and the vehicle behind it and also a guiding structure to limit the plow to movement up and down with respect to the vehicle behind it to prevent the plow from tilting or swerving with respect to the vehicle.

The composite member 19, 20, 22 of the guide is provided upon the pushing vehicle and moves up and down, while the guide member 21, 23 is provided upon the plow and also moves up and down, these two members of the guide moving up and down with respect to each other so that the plow may accommodate itself to the level of the ground upon which it is moving whether that level is different from or is the same as that upon which the pushing vehicle is moving.

The controller for the steering mechanism includes the arm 14, hitherto described, and a horizontal shaft extending longitudinally of the tractor and inclusive of two universally jointed sections 24, 25. The shaft section 25 is mounted to rotate and slide in a journal 26 carried by an upright support 27 mounted upon the pushing vehicle 16. The steering hand wheel 28 is carried upon the rear end of the shaft section 25 where it is accessible to the operator.

When the snow plow is being pushed through the snow, the shovel 3 serves to lift and break the snow and the cutter 4 serves to divide the lifted snow into portions which are to be cast laterally upon each side of the plow. The shovel and cutter jointly serve thoroughly to break up any hardened snow and crust which may have formed, preparatory to the discharge thereof upon the sides of the plow. Any suitable means may be employed for effecting the lateral discharge of the snow. In the construction illustrated, there is a revoluble discharger 29 provided upon each side of the cutter 4, each discharger being desirably mounted to turn in an upright plane that is perpendicular to the line of travel. The dischargers 29 are each desirably composed of a plurality of radiating blades 29'. The dischargers are revolved in opposite directions with their lower portions moving toward the cutter 4 and their upper portions moving away from the cutter. Any suitable means may be employed for causing the dischargers to turn in this way. I have illustrated two endless sprocket chains 30, these chains being driven in opposite directions by pinions 31 which are turned in opposite directions by an engine or motor 32 through the intermediation of suitable transmission mechanism. This engine is carried upon the plow directly over the cutter 4 and the shovel 3 so as to add to the weight which is borne by the plow runners 2, 2, 9, whereby the runners and the shovel are brought as close to the ground as traffic conditions permit. By so locating the engine, the length of the plow is maintained at a minimum, this being important, where the plow is not self propelled but caused to travel by some other vehicle in tandem therewith. Any suitable means may be employed for defining the paths followed by the snow after having been set into motion by the rotary dischargers. I have employed fenders, one upon each side of the cutter 4, and each located in a vertical zone which is inclusive of the zone in which the dischargers turn. Each fender desirably includes a stationary section 33 located adjacent the engine and a section 34 mounted to turn upon a horizontal axis where it is articulated with the section 33. Links 35 connect the fender sections 34 with the body of the plow, the effective length of these links being adjustable to define the angles of the adjustable fender sections.

In the embodiment of the invention illustrated, the links are formed with a number of holes 36 along the same at the lower ends. Coupling pins 37 are passed through holes in brackets 38 and through the selected holes in the links whereby the adjustable fender sections 34 are maintained in their selected adjustments.

It is obvious that changes may be made without departing from the spirit of my invention.

Having thus described my invention I claim as new and desire to secure by Letters Patent the following:—

1. A plow including a downwardly and forwardly inclined substantially horizontal shovel; and an upright cutter located at and above a mid portion of said shovel.

2. A plow including a downwardly and forwardly inclined substantially horizontal shovel; and a cutter of wedging formation located at and above a mid portion of the shovel with its wedging edge at the front and angular to the shovel.

3. A plow including a downwardly and forwardly inclined substantially horizontal shovel; an upright cutter located at and above a mid portion of said shovel; rotary dischargers mounted to turn above the shovel and having the cutter therebetween.

4. A plow including a downwardly and forwardly inclined substantially horizontal shovel; a cutter of wedging formation located at and above a mid portion of the shovel with its wedging edge at the front and angular to the shovel; rotary dischargers mounted to turn above the shovel and having the cutter therebetween.

5. A plow including a downwardly and forwardly inclined substantially horizontal shovel; an upright cutter located at and above a mid portion of said shovel; rotary dischargers mounted to turn above the shovel and having the cutter therebetween; and a motor in driving relation to said rotary dischargers and mounted above said cutter.

6. A plow including a downwardly and forwardly inclined substantially horizontal shovel; a cutter of wedging formation located at and above a mid portion of the shovel with its wedging edge at the front and angular to the shovel; rotary dischargers mounted to turn above the shovel and having the cutter therebetween; and a motor in driving relation to said rotary dischargers and mounted above said cutter.

7. A plow including a downwardly and forwardly inclined substantially horizontal shovel; an upright cutter above the shovel; and a rotary discharger along side of the cutter.

8. A plow including a downwardly and forwardly inclined substantially horizontal shovel; an upright cutter above the shovel; and a rotary discharger alongside of the cutter; and a motor in driving relation to said rotary discharger and located above said shovel.

9. A plow including a downwardly and forwardly inclined substantially horizontal shovel; and an upright cutter above the shovel.

10. A plow including a downwardly and forwardly inclined substantially horizontal shovel; an upright cutter above the shovel; and a rotary discharger alongside of the cutter.

11. A plow including a downwardly and forwardly inclined substantially horizontal shovel; an upright cutter above the shovel; and a rotary discharger above the shovel.

12. A plow including a downwardly and forwardly inclined substantially horizontal shovel; an upright cutter above the shovel; a rotary discharger above the shovel; and a motor in driving relation to said rotary discharger and located above the shovel.

13. A plow including a downwardly and forwardly inclined substantially horizontal shovel; an upright cutter above the shovel; and a rotary discharger above the shovel.

14. A plow including a downwardly and forwardly inclined substantially horizontal shovel; an upright cutter above the shovel; and a discharger positioned to remove matter dislodged by the plow.

15. A plow including a downwardly and forwardly inclined substantially horizontal shovel; a discharger located above said shovel; and a motor for operating the discharger and located above the shovel.

16. A plow including a downwardly and forwardly inclined substantially horizontal shovel; a rotary discharger located above said shovel; and a motor for operating the discharger and located above the shovel.

In witness whereof, I hereunto subscribe my name this eighth day of December A. D., 1923.

ARTHUR B. WEBB.